Dec. 9, 1969    R. NEBOLSINE    3,482,627
APPARATUS EFFECTING AND CONTROLLING THE FILTRATION OF FLUIDS
AND RECHARGE OF UNDERGROUND FORMATIONS BY SPECIAL WELLS
Filed Dec. 13, 1967    2 Sheets-Sheet 1

INVENTOR.
Ross Nebolsine
BY H. Lee Helms
Attorney

Dec. 9, 1969 R. NEBOLSINE 3,482,627
APPARATUS EFFECTING AND CONTROLLING THE FILTRATION OF FLUIDS
AND RECHARGE OF UNDERGROUND FORMATIONS BY SPECIAL WELLS
Filed Dec. 13, 1967 2 Sheets-Sheet 2

INVENTOR.
Ross Nebolsine
BY H. Lee Helms
Attorney

United States Patent Office 3,482,627
Patented Dec. 9, 1969

3,482,627
APPARATUS EFFECTING AND CONTROLLING THE FILTRATION OF FLUIDS AND RECHARGE OF UNDERGROUND FORMATIONS BY SPECIAL WELLS
Ross Nebolsine, 64 E. 86th St., New York, N.Y. 10028
Filed Dec. 13, 1967, Ser. No. 697,259
Int. Cl. E21b *43/04, 43/08*
U.S. Cl. 166—51                                5 Claims

ABSTRACT OF THE DISCLOSURE

Apparatus for operating recharging wells, which consists in means for providing a well with a replaceable granular filter media adjacent an exposed surface area of the ground formation of the well, along with bounding the interior surface of said granular filter media by means of an elongated apertured casing, and, at the time of placement in the well of said filter media, supporting vertically spaced areas of said filter media by supports adjacent said casing and projected outwardly but short of said ground formation, thereby providing vertically spaced zones of said filter media in relatively uncompacted and loosened state, flowing a recharging fluid into the well, outwardly through said apertured casing into the filter media and thence to the ground formation, and thereafter backwashing the granular filter media adjacent the casing by an inwardly directed flow of fluid from the well, into the casing via the apertures thereof, and thence out of the well, said backwashing flow being achieved by producing a differential hydrostatic pressure between the fluid in the well adjacent said underground formation and the interior of said casing.

---

In the means for effecting the method an inner perforated casing is preferred as disposed within and spaced from said outer casing, said casings being adapted to bound a flowable filter media, means being provided for passage of fluid into said inner casing and thence through its perforations to said filter media and the ground formation, said inner casing being adapted for flow of fluid inwardly and outwardly thereof, in combination with screen means carried by the casings and having voids of lesser area than the casing perforations, means being provided for backwashing the well through differential hydrostatic pressure between the fluid in the ground formation and the fluid interiorily of the perforated casings (which generally is water), outflow duct means at the top of the casing, and airlift means within the casing.

The apparatus comprises means for effecting and controlling the recharge of underground formations by special wells, which comprises an elongated perforated casing adapted to face the ground formation of a well and inlet means adapted for flow of filter media exteriorily of said casing from a top area of a well, means adapted for passage of fluid into said casing and thence through its perforations to said filter media and the ground formation, said casing being adopted for flow of fluid both inwardly thereof and outwardly thereof, and vertically-spaced supporting members extending outwardly adjacent said inner casing and adapted in the down flow of filter media, as through said inlet, to provide zones of said filter media adjacent said casing in relatively uncompacted and loosened state.

Many efforts have been made to improve recharging operations which consist of feeding a depleted aquifer, with surplus surface water, conveyed to it through some sort of well. Whilst this has been achieved in certain measure by pumping clarified water into a well in which the groundwater level has dropped, it has been found that the rate of intake is comparatively low and more importantly the recharging capacity drops with time and cannot be fully restored. This is due to two factors. One is that most treated water still contains some suspended solids. These are filtered out by the ground formation adjacent the well. After a period of time that formation area-screen becomes clogged and consequently the rate at which the water can be fed into the ground drops. The formation can also get clogged by biological growths or preciptation of some of the dissolved chemicals periodically added to water fed into the recharging well.

At a certain point it is necessary to reverse the feeding of the water into the well to effect the purging of the formation that has been clogged, for one reason or another. This operation cannot be fully effective for the reason that, as the water is pumped out of the well, portions of the formation that have been least affected by clogging will feed water back into the well, but the sealed off sections will remain unpurged. With time as further clogging takes place, the effect of such backwashing operations become more limited until only a small portion of the exposed formation remains receptive, which results in a substantial diminution of the recharging capacity of the well with no effective means to flush out and thus clean the entire exposed surface of the underground formation.

The second reason is similar to the first except that it does not involve particular elements, but is caused by the compression of the porous granular material adjacent to the well screen against itself by the steep pressure gradient of the water as it emerges from the well and enters the underground formation.

The phenomenon of a sharp reduction in the permeability of a granular material, if it is subject to compression, is well known. Thus even if only completely clarified water is fed into a well, its capacity to recharge a depleted ground aquifer will, after a certain time, drop and this cannot be fully restored for the same reasons stated in the preceding paragraph.

My invention is directed to removing these difficulties of effecting recharging operations through wells of presently known design.

A first remedy, subject of my Patent No. 2,629,447, consists of equipping a specially designed well with means to reverse the recharging flow of water into the aquifer by providing a separate escape of the water from the aquifer through selected sections of the well screen. The result is that each part of same and of adjacent aquifer would be subject in turn to a purging action over the period of time the entire exposed (receptive) area of the aquifer is selectively backwashed and the extraneous material lodged into the formation is cleaned out. The description of how this is achieved is fully explained in my said patent.

Further investigation and studies showed that whilst such as assembly, per se, and its proper control improved the operation of a given recharging well, it would not cope fully with the second basic cause of the progressive loss in recharging capacity of such wells. The effort to backwash the aquifer when not accompanied by adequate loosening of the clogged material in the immediate vicinity of the well screen was not a complete cure. Universal experience with filters has demonstrated that, when a filter is backwashed, the filter-media must be loosened, and its constituent particles agitated so as to permit the escape of the lodged extraneous material. In other words, the bulk volume of the filtering media must be increased so that the particles are separate from each other to allow the intercepted material to move back through them and the particles rub against each other, stripping the dirt off their surfaces.

In addition, recharging operations would be greatly improved and the life of the recharging well prolonged practically indefinitely if means were found to equip the well with its own renewable filtering media.

My second remedy in accordance with the present invention provides apparatus and methods by which the stated objectives are achieved, will now be described with reference to the accompanying drawings, in which.

Figure 1:
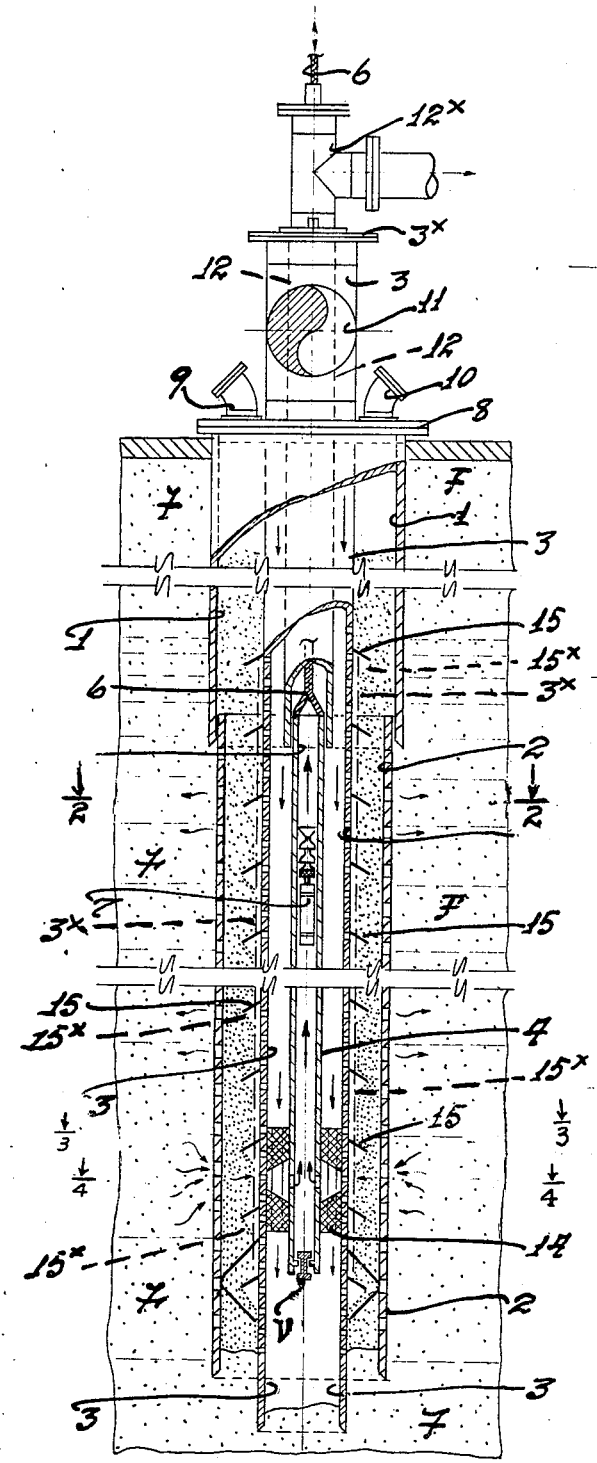
FIG. 1 is a view in elevation, partly in vertical section, showing the invention applied to an underground recharging well.

In the construction of FIGURES 1 to 4, inclusive, a well is sunk to a sufficient depth, and will consist of a plurality of concentric casings. In FIG. 1 the outermost casing 1 consists of a non-perforated tubular member driven down into the earth only part of the total desired depth of the well, but preferably to meet the ground formation to be recharged.

Somewhat teelscoping into casing 1 is a perforated casing 2 which is driven into the ground for a substantial distance and with its top overlapped by casing 1. Within casing 2 and spaced therefrom is a casing 3, the bottom of which is positioned below the bottom of casing 2, the wall of casing 3 being perforated at least up to casing 1. Perforated casing 3 is covered by a bronze or stainless wire mesh screen indicated at $3^x$, to bar the filtering media F from entering the interior of said casing 3, but coarse enough to allow the intercepted extraneous particles to pass through the screen during backwashing operations.

Surrounding the elongated casing 3 are a plurality of spaced annular plates 15, which are inclined downwardly, their marginal edges being spaced from perforated casing 2. Also it will be noted from FIG. 1 that the casing 3 has applied thereto a wire mesh screen indicated at $3^x$ and which may be made of bronze or stainless steel. The inclined spaced plates may be attached directly to the outer wall of casing 3 and sections of wire mesh screen $3^x$ be tack welded to casing 3 between each two spaced plates.

Within casing 3 and spaced therefrom is an elongated tube 4 which is suspended by a cable 6. However, the tube 4 is open at its upper end. The cable may also act as a power conductor leading to an electrical suction pump diagrammatically indicated at 7. At its lower end tube 4 contains a valve V as and for the purposes shown and described in my Patent No. 2,629,447. The top of casing 1 projects to or above the ground surface and is closed by a cap 8, provided with inlets 9 and 10 for the filter media which may be sand of selected grading; and rising through cap 8 is an imperforate upper end area of casing 3 which is provided with valved inlet arrangement 11 for controlled feeding of recharging fluid. The said upper extension of casing 3 is provided with cap $3^x$, on which is mounted an outlet duct $12^x$ communicating with an elongated guide sleeve 12 for elongated tub 4, the hoist cable 6 for the latter extending through outlet member $12^x$ for manipulation.

Figure 2:
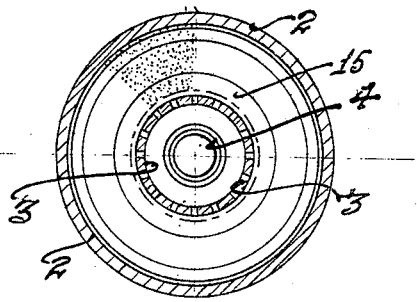
FIG. 2 is a horizontal section taken on the line 2—2, FIG. 1, looking downward in direction of the arrows.
Figure 3:
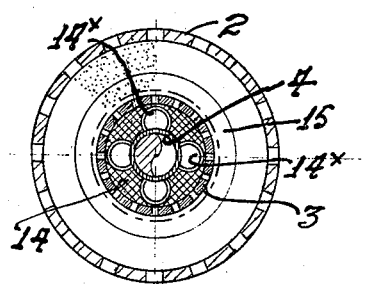
FIG. 3 is a horizontal section, taken on the line 3—3, FIG. 1, looking downward in the direction of the arrows.
Figure 4:
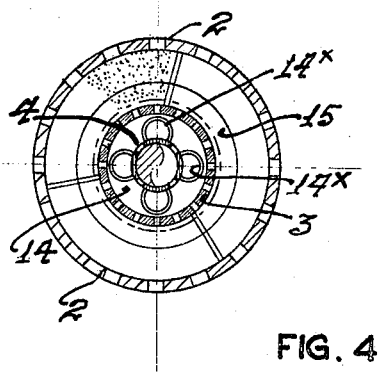
FIG. 4 is a horizontal section taken on the line 4—4, FIG. 1, looking downward in the direction of the arrows.

Close to the bottom of the elongated and perforated tube 4, and carried thereby, is a cleaning or backwash head 14 of the general form shown in FIG. 2 of my Patent No. 2,269,447. Reciprocation of tube 4 will carry its head 14 up and down within perforated casing 3. Pipes $14^x$ provide passage through the head for water and the head is provided with a central passageway at $14^{xx}$ to provide communication between the interior of tube 4 and the filter media exterior the perforated casing 3.

In the operation of the embodiment shown in FIGURES 1 to 4, inclusive, water or other selected fluid is led into casing 3 via inlet 11 after casing 2 has been filled or substantially filled with filter media F. The fluid passes through apertures in casing 3 both above and below the cleaning (backwash) head, freely passing through the tubes $14^x$ which project through the head. This intake of fluid may be under pressure, and above gravity if desired. After passing through the filter media, the water or other fluid is discharged through the apertures of casing 2 into the ground formation to be recharged.

The spaced annular and downwardly inclined plates 15, receive and give support to areas of the sand or other filtering media above them. Due to the laws of gravity and the coefficient of friction of loose granular materials, below each annular plate there will be a space in the form of an annular pocket, generally bounded by the dotted lines $15^x$, in which the sand or other filtering media will be either absent or of much lower density. This will achieve a purpose.

In a period of time, suspended or dissolved solids and/or organic material in the recharging fluid will gradually clog the underground formations or aquifer outside and in immediate contact with the well screen. Backwashing operations without the possibility to loosen the ground that is acting as a filtering media would thus not be entirely effective. In the present invention, a selected filter media is introduced into the annular space between casings 2 and 3. The inclined spaced plates 15 create in the spaces immediately below each plate, voids or else zones of very loose sand or other filter media. Therefore in backwashing, which in the present invention is effective through elongated tube 4, via the head 14, the latter may be drawn upwardly to progressively expose the perforated areas of casing 4 due to hydrostatic pressure of the fluid in the ground formation, augmented when required by the suction of pump 7. The voids or zones or lower density of the sand or other filter media under each annular plate 15, will permit water bulking of the sand subject to the reverse movement of water out of the formation and into the backwashing casing, which will tend to move the sand or other filtering media against the entire surface of the wire mesh screen $3^x$. This water filling in of the voids or zones of low density sand or the filtering media adjacent the screen, will enable the filter particles to be mutually separated and agitated, thus rubbing against each other, stripping the dirt off their surfaces so that the clogging material will be loosened and the filtering action restored to normal degree.

Once the backwashing of this section of the well has stopped and water is again being fed into the aquifer, the sand or filtering media will regain its previous position and distribution the casing 2, and again creating the aforementioned voids and low density zones under plate 15.

Figure 5:
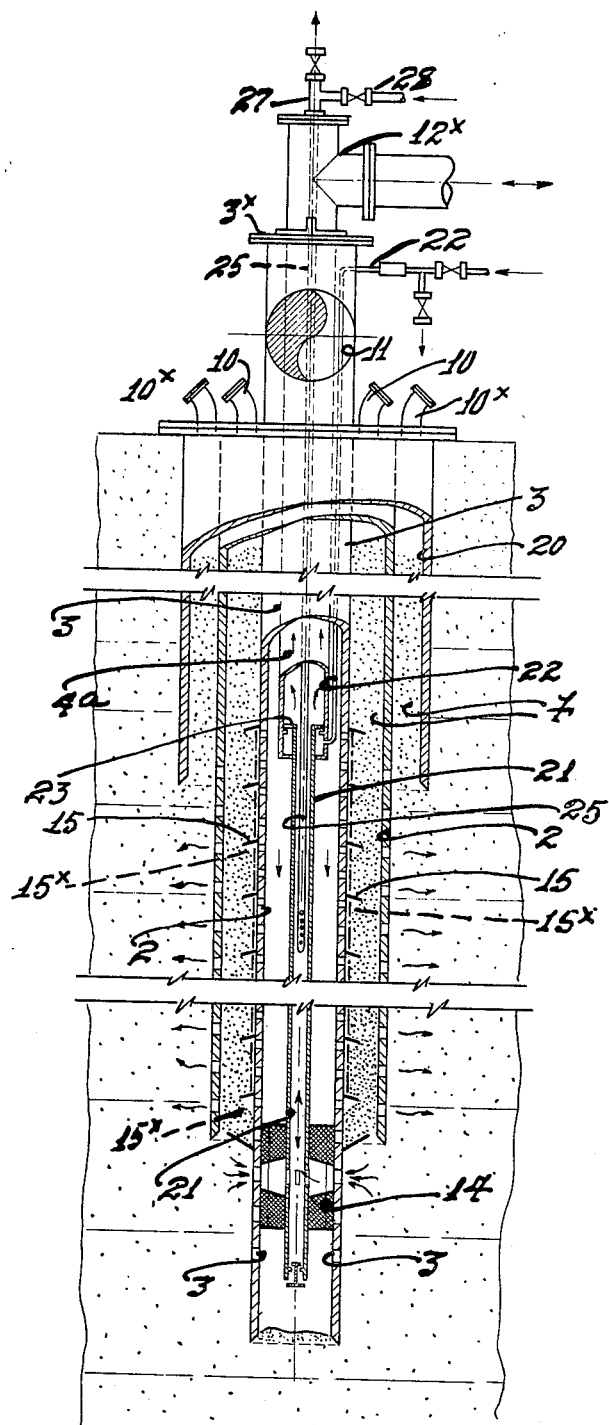
FIG. 5 is a view in elevation, partly in vertical section through a modified filtering and backwashing assembly.
Figure 6:
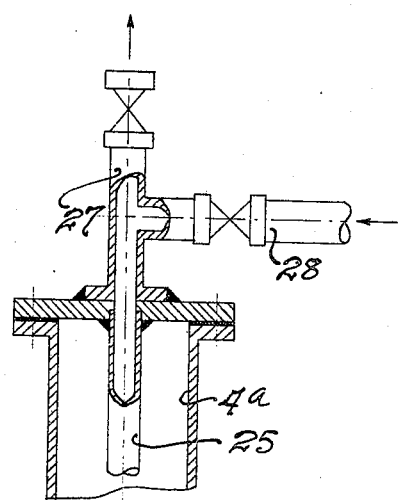
FIG. 6 is a fragmentary vertical section taken on the line 6—6, FIG. 5.
Figure 7:
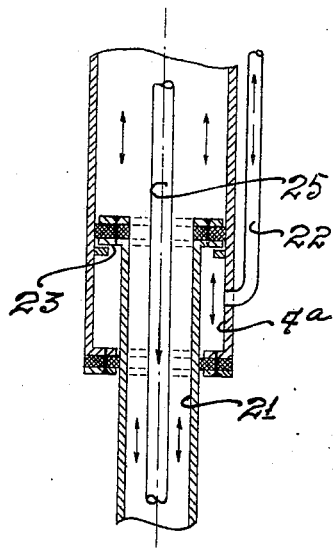
FIG. 7 is an enlarged fragmentary vertical section of the "air lift" shown in FIG. 5 at 40.

A modified design of the apparatus is shown on FIGURES 5–7 inclusive, the elements corresponding to those on FIG. 1 bearing the same numerals. The diameter of the outside casing 20 is considerably larger than that of casing 2. This serves the purpose of allowing fresh filter media to be fed from inlets $10^x$ into the aquifer to replace any of the in situ material in the immediate vicinity of casing 2 that may have been sucked out by the backwash operations, or following the deliberate removal of some of this material at the bottom of the well by the means of the cleaning head when it is in its lowest position. This also prevents the caving in of the ground due to the abstraction of the material adjacent to the water wall of casing 2. The other objective is to be able to replace with selected filtering material the portions of the aquifer most likely to get clogged or packed too tightly.

The second variation is that a casing 21 carrying the cleaning head 14 may be moved up and down and inside casing 3, not by means of a cable extending through the top of the well head, as previously described, but by fluid action within the annular inside space of the casing 4⁴ and outside of casing 21. This pressure of this fluid may be created by a hydraulic pump on the surface (not shown), fed through a small diameter pipe or flexible pressure hose 22 into the lower end of casing 4⁴ and against piston 23 between the inside wall of casing 4⁴ and the outside wall of casing 21.

Thus the fluid driven by the hydraulic pump can be made to raise the casing 21 assembly, with the cleaning head 14 attached to its bottom, up to an elevation that would correspond to this cleaning head being opposite the uppermost perforated portion of casing 3. By stopping the pump and releasing the pressure, the weight of the casing assembly 21 will cause it to slowly drop to its bottom position. In this way the hydraulic fluid will be forced out of the annular space, back through the pipe 22, and gradually the assembly descends to the bottom of the well so that the cleaning head 14 will be in its lowest position, just below the perforated section of casing 3. This equipment and method permits the raising and lowering of the cleaning head in a desired manner, and this can be done based on a time schedule or governed by the build-up of hydraulic pressure in the water being introduced into the aquifer to a certain point, as though clogging of the filter media in the annular space between the outside of casing 3 and the inside of casing 2.

As in the construction of FIG. 1, casing 4⁴ communicates with an outlet duct which has a vertical extension 12ˣ at the top of cap plate 3ˣ. Donwardly extending through cap plate 3ˣ is an air lift tube 25, perforated at its lower end to act as a member of an air lift which includes valved extensions 27 and 28, in practice the later leading to a suction pump (not shown).

It will be understood that various modifications may be made in the form and arrangement of the elements consituting the amendment of the invention without departing from the spirit of the invention. For example, the spacing between the filter media supporting plates may be substantially varied, a recommended and characteristic spacing being twelve to fourteen inches.

Having described my invention, what I claim and desire to secure by Letters Patent, is as follows:

1. Means for effecting and controlling the recharge of underground formations by special wells, which comprises an elongated perforated casing adapted to face the ground formation of a well and inlet means adapted for flow of filter media exteriorily of said casing from a top area of a well, means adapted for passage of fluid into said casing and thence through its perforations to said filter media and the ground formation, said casing being adopted for flow of fluid both inwardly thereof and outwardly thereof, and vertically spaced supporting members extending outwardly adjacent said inner casing and adapted in the down flow of filter media, as through said inlet, to provide zones of said filter media adjacent said casing in relatively uncompacted and loosened state, said supporting members being mutually spaced distances above and below areas of said casing having perforations providing zones directly facing said filter media and permitting direct lateral flow of fluid to and from said filter media to the perforations of the casing in said last named zones.

2. Means for effecting and controlling the recharge of underground formations by special wells constructed in accordance with claim 1 in which the filter media supports are outwardly projected from the casing and in the form of downwardly inclined annular plates, and a second perforated casing outwardly spaced from the first named casing, the two casings providing an annular chamber for the filter media, the supporting members carried by said first named casing having their outer margins substantially spaced from said second named casing.

3. Means for effecting and controlling the recharge of underground formations by special wells constructed in accordance with claim 1 in combination with screen means carried by the casing intermediate said filter media supports and having voids of lesser area than the perforations of the casing.

4. Means for effecting and controlling the recharge of underground formations by special wells, constructed in accordance with claim 1, in combination with means for backwashing the well by augmenting a differential hydrostatic pressure between the fluid in the ground formation and the interior of the perforated casing, said means consisting of out-flow duct means at a top area of the casing, airlift means within the casing and adapted to force fluid upwardly through the casing, and means for actuating said air lift means.

5. Means for effecting and controlling the recharge of underground formations by special wells, constructed in accordance with claim 1, comprising a guide tube (4ª) within the casing, a second tube telescopically carried by said guide tube, a piston head carried by said second tube within the guide tube, fluid pressure conducting means having a discharge port under said piston head for movements of said second tube, a reverse flow head carried by said second tube and adapted to withdraw fluid from the underground formation of the well via the filter media surrounding the casing and the perforations of the casing, and at areas of the casing selected by movements of said second tube, and a pump in said second tube above its head.

References Cited

UNITED STATES PATENTS

| 1,382,295 | 6/1921  | Layne        | 166—51  |
| 2,213,987 | 9/1940  | Layne        | 166—44  |
| 2,512,801 | 6/1950  | Kinney et al. | 166—191 |
| 2,762,439 | 9/1956  | Pomeroy      | 166—191 |
| 2,918,973 | 12/1959 | Ozinga       | 166—191 |
| 3,062,284 | 11/1962 | Brown        | 166—51  |

FOREIGN PATENTS

| 231,373   | 5/1909  | Germany. |
| 1,132,679 | 11/1956 | France.  |

JAMES A. LEPPINK, Primary Examiner

U.S. Cl. X.R.

166—191, 236